United States Patent [19]
Kawatra et al.

[11] Patent Number: 5,524,836
[45] Date of Patent: Jun. 11, 1996

[54] METHOD FOR PRODUCING POWDER FROM POLYCRYSTALLINE INORGANIC MATERIAL

[75] Inventors: Surendra K. Kawatra; Timothy C. Eisele, both of Houghton, Mich.

[73] Assignee: Board of Control of Michigan Technological University, Houghton, Mich.

[21] Appl. No.: 16,850

[22] Filed: Feb. 12, 1993

[51] Int. Cl.$^6$ .......................... B02C 19/00; B02C 19/12
[52] U.S. Cl. ................................. 241/1; 241/18; 241/23; 241/29
[58] Field of Search .................. 241/1, 18, 23, 241/24, 29

[56] References Cited

U.S. PATENT DOCUMENTS

| | | | |
|---|---|---|---|
| 2,849,309 | 8/1958 | Whaley | 75/135 |
| 2,881,067 | 4/1959 | Hivert et al. | 75/0.5 |
| 2,950,185 | 8/1960 | Hellier et al. | 75/0.5 |
| 3,034,888 | 5/1962 | Lefever | 75/82 |
| 3,880,652 | 4/1975 | Wehn et al. | 75/84.5 |
| 4,445,931 | 5/1984 | Worthington | 75/0.5 B |
| 4,519,837 | 5/1985 | Down | 75/0.5 B |
| 4,871,117 | 10/1989 | Baueregger et al. | 241/23 |
| 5,110,374 | 5/1992 | Takeshita et al. | 148/101 |
| 5,464,159 | 11/1995 | Wolf et al. | 241/1 |

OTHER PUBLICATIONS

Budavari, S., The Merck Index, 10th Edition, Merck, Rahway, N.J., p. 1220, Published 1983.
Addison, C. C., 1984, "Manipulation of the Liquids", The Chemistry of the Liquid Alkali Metals, Wiley, New York, pp. 11–14.
Corning Glass Work, 1965, *Properties of Selected Commercial Glasses*, Corning Glass Works, Corning, N.Y., 16 pp. .
Naughton, J., Barnes, I. L., Hammond, D. A., 1965, "Rock Degradation by Alkali Metals: A Possible Lunar Erosion Mechanism", Science, vol. 149, Aug. 6, pp. 630–632.
Weiblen, P. W., Gordon, K. L., 1988, "Characteristics of a Simulant for Lunar Sufrace Materials", Lunar Planetary Institute, Apr. 5–7.

*Primary Examiner*—John Husar
*Attorney, Agent, or Firm*—Michael, Best & Friedrich

[57] ABSTRACT

A method for producing powder from polycrystalline inorganic material by contacting polycrystalline inorganic material with the vapor of one or more reduced alkali metals in an environment substantially free of oxygen for a period of time sufficient to cause disintegration of the polycrystalline inorganic material into powder. The polycrystalline inorganic material may consist of one or more oxides, sulfides, or silicates, or combinations thereof. The polycrystalline inorganic material may also comprise a rock or mineral, such as basalt or pyrite.

22 Claims, 2 Drawing Sheets

METHOD FOR PRODUCING POWDER FROM POLYCRYSTALLINE INORGANIC MATERIAL

BACKGROUND OF THE INVENTION

The invention relates generally to methods of producing fine powders from bulk polycrystalline inorganic materials.

REFERENCE TO PRIOR ART

In recent years, the demand for fine powders of inorganic materials has increased substantially. As used herein, "powder" means a material in particulate forms substantially composed of particles ranging in size from 1 μm to 500 μm. Much of this demand is attributed to the consumption of such powders as filler material in the paint, plastic and paper industries and also production of high tech ceramic, electronic, and optical products. Shortages are a direct result of the inability of current processes to produce powders with specified size and purity on an industrial scale.

Traditional methods for producing inorganic powders consist of grinding bulk material in ball mills and attritors. An advantage of grinding is the high quantity of material that can be processed. Research in this area has led to several improvements, particularly in attrition microgrinding and new mill designs. However, several problems still remain. Among these is the large amount of energy required to grind material to fine sizes. This alone makes grinding an expensive processing step. An additional drawback is the loss of grinding media. Losses due to abrasion and corrosion can amount to 1 kg per ton of material produced, and significantly reduce the purity of such material. Another problem with grinding is that the powder produced is distributed over a large particle size range. Consequently, alternatives to grinding have received great attention.

One alternative technique used in ceramic and nuclear fuel production is the sol-gel process. The sol-gel process involves the preparation of a colloidal suspension which is dispersed over a column of water-immiscible inorganic liquid serving as a dehydrating agent. The dried gel produced is disintegrated, resulting in a powder of fine grain size and high density. Particle size can be as small as 10 nm.

Another technique is vapor deposition, also known as chemical vapor deposition (CVD). This method is currently used in placement of thin film coatings on semiconductors. In CVD, a metal oxide is deposited onto a substrate surface in a film thickness which can be as thin as 10 nm.

Investigators are also exploring the use of ultrasonics. This method involves directing a stream of material onto an ultrasonic horn tip to atomize the material. Although powder size and purity control is excellent, this process is limited to producing small quantities of powders.

The precipitation and deposition processes tend to be low-capacity and high-cost, while the mechanical grinding methods are energy-intensive and generally contaminate the material being ground with material abraded from the mill and grinding media. In addition, particle sizes ranging from 1 to 10 microns are generally too small to be easily accomplished by mechanical grinding, and are coarser than the product typically produced by precipitation or vapor deposition.

SUMMARY OF THE INVENTION

The invention provides a method for producing powder from polycrystalline inorganic material by contacting polycrystalline inorganic material with the vapor of one or more reduced alkali metals in an environment substantially free of oxygen for a period of time sufficient to cause disintegration of the polycrystalline inorganic material into powder. The polycrystalline inorganic material may consist of one or more oxides, sulfides, or silicates, or combinations thereof. The polycrystalline inorganic material may also comprise a rock or mineral, such as basalt or pyrite.

Other features and advantages of the invention will become apparent to those skilled in the art upon review of the following detailed description, claims and drawings.

DESCRIPTION OF THE PREFERRED EMBODIMENT

Figure 2:
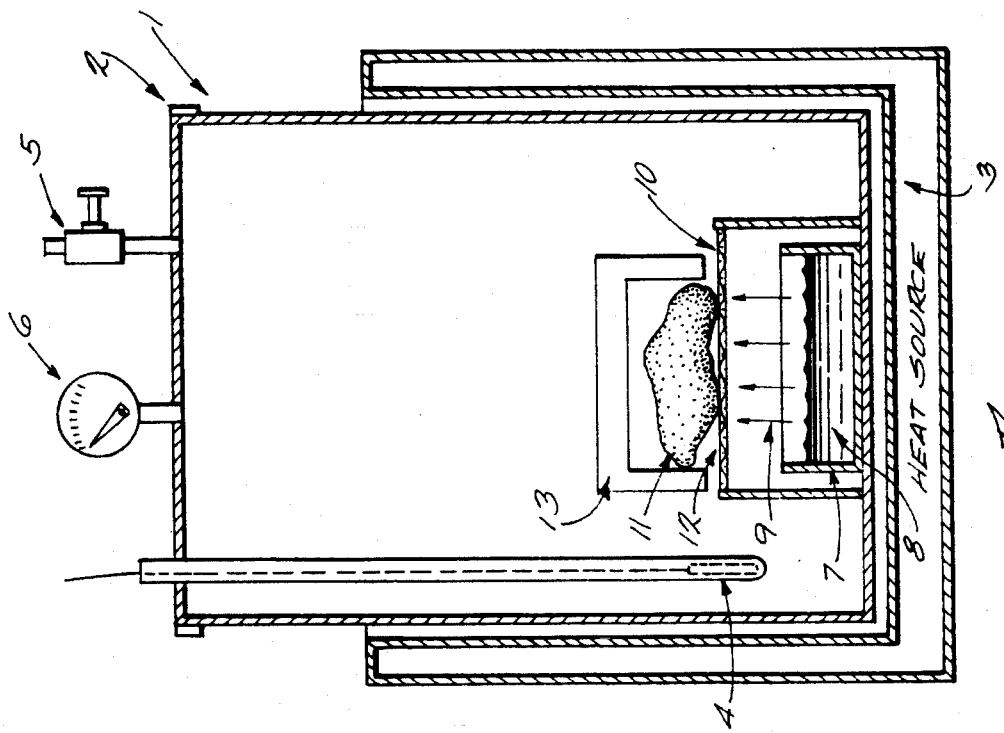
FIG. 2 is a partially schematic drawing of an apparatus for carrying out a method of the invention.

FIG. 2 illustrates apparatus for carrying out a preferred embodiment of the method. It includes a vessel 1 constructed of material resistant to alkali metal vapor, such as stainless steel, sealing means 2, heating means 3, such as an external electric heating element for heating the vessel and its contents, temperature monitoring means 4, such as a thermocouple positioned in a thermocouple well, gas purging means 5, which may be a valve, and pressure monitoring means 6 which may be a pressure gauge. Contain and release means 7 may consist of various means and in the illustrated embodiment is an open top copper crucible for containing alkali metal 8 and allowing release of alkali metal vapor 9. Means for suspending 10 supports the polycrystalline inorganic material 11 for contact with alkali metal vapor 9 to produce powder 12. The means for suspending 10 may consist of various means and in the illustrated embodiment is a fine mesh screen having openings of about 100 microns. The polycrystalline inorganic material 11 may consist of various materials and in the illustrated embodiment is polycrystalline inorganic oxide material. Additional means 13 may be employed to apply vibration, mild abrasion, or impact to the polycrystalline material in order to aid in its disintegration into powder. If high-purity powder is required, the small quantity of alkali metal compounds formed on the particle surfaces can be easily removed by washing the powder 12 with high-purity water after processing 13 completed.

In operation, the polycrystalline inorganic material 11 rests on a fine-mesh screen 10 over a copper crucible 7, which contains molten alkali metal 8. These items are enclosed in a stainless-steel vessel 1 which can be sealed from the atmosphere by sealing means 2, purged with an inert gas such as argon or nitrogen through the gas inlet valve 5, monitored for gas pressure by reading pressure gauge 6, and heated by heating means 3 to a sufficient temperature to vaporize the alkali metal 8. The temperature is monitored by reading the output from thermocouple 4, and maintained by controlling heating element 3 at a temperature sufficient to continue vaporizing alkali metal 8. The reaction is carried out for an appropriate period of time to cause disintegration of the material 11 into powder 12, which depending on the partial pressure of alkali metal vapor 9 may vary from a few minutes to several days. In the case of sodium, the temperature may be about 500° C., the total absolute pressure may be about 760 torr, the partial pressure of sodium vapor may be in the range of about 5 to about 6 torr, and the time period may be about 30 hours.

A method of the invention is most effective for producing powders of oxides, silicates and sulfides of elements which are less reactive than alkali metals, such as iron oxides, nickel oxides and magnesium oxides. The alkali metal vapor is only effective in the reduced state, so oxygen must be excluded from the system. This is accomplished by carrying out the process in a vacuum, or by purging with a gas which is inert towards alkali metals, such as argon. In order to produce a sufficient partial pressure of the metal vapor, the temperature should be high enough to melt the alkali metal. Increasing the temperature increases the partial pressure of vapor and therefore, the disintegration rate, but such temperature increases are limited by the necessity of avoiding melting of the polycrystalline material. When sodium is used, a temperature of 500° C. provides a sodium vapor pressure in the range of about 5 to about 6 torr, which is high enough to produce disintegration within a few hours. The disintegration is carried out in a vessel which is resistant to sodium vapors, such as titanium or stainless steel. Most glasses and ceramics are reduced by alkali metals, and many metals are dissolved by them, and so are not suitable for reactor vessel construction.

The degradation of minerals by alkali metal vapor is attributed to at least two mechanisms. The first is a chemical reduction of susceptible oxides, silicates and sulfides and the second is grain boundary embrittlement. In the first mechanism, vapor penetrates the mineral along cracks and grain boundaries. Ensuing reactions reduce susceptible compounds to produce the less reactive element and alkali metal compounds. The formation of these products decreases the structural integrity of the mineral by severing bonds and distorting the lattice. As stress accumulates, the surface fragments and ultimately peels itself apart.

Figure 1:
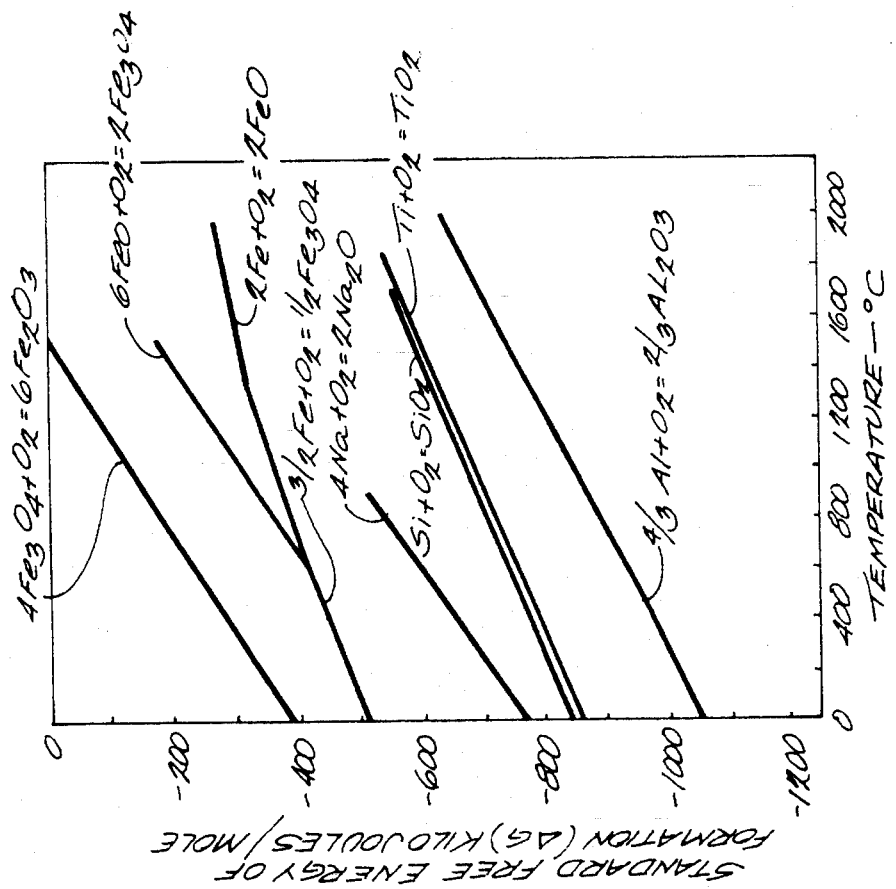
FIG. 1 is an Ellingham diagram displaying Standard Free Energy of Formation as a function of Temperature for various Oxides.

Although minerals contain many oxides, silicates and sulfides, thermodynamics indicate that particular alkali metals, such as sodium, will not reduce $SiO_2$, $TiO_2$, and $Al_2O_3$. Evidence is provided by the relative positions of the compounds in FIG. 1, and the change in free energy for reactions shown in Table 1. Since the lines corresponding to the formation of $SiO_2$, $TiO_2$, and $Al_2O_3$ in FIG. 1 are below the line corresponding to $Na_2O$, their free energy of formation is more negative and they are therefore more stable than $Na_2O$. Therefore, sodium will not react with them. This is confirmed by the positive $\Delta G$ values for reactions 1–3 in Table 1, indicating they will not proceed in the written direction. Using a similar approach it can be shown that sodium spontaneously reduces iron oxides to form sodium oxide, which is more stable. This is supported by the negative $\Delta G$ values in reactions 4–7 in Table 1. Therefore, according to this mechanism, fragmentation will only occur along iron oxide grain boundaries. Grains bounded by an iron oxide would be liberated along that edge. However, grain boundaries between particles of $SiO_2$, $TiO_2$, or $Al_2O_3$ would remain locked. As a result, both free and locked particles will be produced and will vary with the grain association of the material.

TABLE 1

Change in Free Energy for Reactions Between Sodium and Various Oxides at 500° C.
(Source: Kubaschewski and Alcock, 1979)

| | |
|---|---|
| $4\ Na + SiO_2 \rightarrow 2\ Na_2O + Si$ | $\Delta G = +149313$ joule/mol (1) |
| $4\ Na + TiO_2 \rightarrow 2\ Na_2O + Ti$ | $\Delta G = +187253$ joule/mol (2) |
| $6\ Na + Al_2O_3 \rightarrow 3\ Na_2O + 2\ Al$ | $\Delta G = +510356$ joule/mol (3) |
| $2\ Na + FeO \rightarrow Na_2O + Fe$ | $\Delta G = -96255$ joule/mol (4) |
| $2\ Na + Fe_3O_4 \rightarrow Na_2O + 3\ FeO$ | $\Delta G = -81465$ joule/mol (5) |
| $2\ Na + 3\ Fe_2O_3 \rightarrow Na_2O + 2\ Fe_3O_4$ | $\Delta G = -187602$ joule/mol (6) |
| $2\ Na + Fe_2O_3 \rightarrow Na_2O + 2\ FeO$ | $\Delta G = -116846$ joule/mol (7) |

Minerals can also be eroded into powder by grain boundary embrittlement. In this mechanism, when a grain has a composition that is easily wetted by alkali metal, the alkali metal vapor will penetrate grain boundaries spontaneously. This reduces the cohesion between the grains and causes fracturing along the grain boundary. Fracturing can proceed along all types of grain boundaries regardless of its chemical reactivity with alkali metal vapor.

Generally, in order for alkali metal vapor to degrade inorganic material into a powder two criteria must be met. First, the material must have a well defined grain structure to allow alkali metal vapor to penetrate. Second, the material must have components that will chemically react with alkali metal, or be easily wetted by alkali metal.

The following examples are merely illustrative of a method of the invention, and are in no way to be considered limiting.

EXAMPLES

Example 1

A stainless steel pressure vessel having a gas valve, pressure gauge, thermocouple well and thermocouple was used to contain the experiments. Approximately 1 to 2 grams of the alkali metal sodium was weighed and placed in the copper crucible. A sample of material was placed on a screen having 100 micron openings supported above the crucible, so that the sample would be located directly in the path of rising vapor. The vessel was sealed, purged with the inert gas argon, and pressurized to an absolute pressure of about 1300 torr, to create an oxygen-free environment. The vessel was heated to a temperature in the range of about 500° C. over a period of approximately 2 hours with an external electric heater. The temperature was maintained at 500° C. for the duration of the experiment.

In experiments with basalt, 10 mm cubes were cut with a diamond saw from a fine grained basalt and polished on all six surfaces. In other experiments, basalt particles sized between 1.19 and 1.68 mm were prepared by stage crushing and screening. The basalt was obtained from a sill located in Duluth, Minn. (Weiblen, 1988). The sill is 1 to 2 meters thick and is part of the Midcontinent rift system. The average grain size is 0.05 to 0.10 mm. Texture is equigranular with a preferred orientation of plagioclase. Average values of the major chemical constituents are listed in Table 2.

TABLE 2

| Composition of Fine Grained Basalt | |
|---|---|
| | Average % |
| $SiO_2$ | 43.86 |

TABLE 2-continued

Composition of Fine Grained Basalt

|  | Average % |
|---|---|
| $TiO_2$ | 6.32 |
| $Al_2O_3$ | 13.68 |
| FeO | 13.40 |
| $Fe_2O_3$ | 2.60 |
| MgO | 6.68 |
| MnO | 0.19 |
| CaO | 10.13 |
| $Na_2O$ | 2.12 |
| $K_2O$ | 0.28 |
| $P_2O_5$ | 0.20 |
| $CO_2$ | 0.00 |

Examination of a basalt cube after exposure to sodium vapors for 30 hours showed severe damage had occurred. Deep cracks, pitting, and spalled fragments that were evident over the entire surface. The spalled fragments were easily removed from the surface and very brittle.

The screen next to the basalt cube was completely covered by a layer of fragmented particles which had apparently popped off the surface. Analysis of the fragments showed they had extremely rough surfaces and were irregularly shaped. Both free and locked particles were produced. The size distribution of the fragments, shown in Table 3, ranged from 15 μm to 704 μm.

TABLE 3

Size distribution, in cumulative percent passing, of basalt fragments.

| Particle Size (μm) | Basalt Cube Fragments | 1.19 to 1.68 mm Particle Fragment |
|---|---|---|
| 704 | 100.0 | 100.0 |
| 497 | 96.6 | 98.4 |
| 352 | 89.0 | 95.2 |
| 248 | 74.3 | 83.9 |
| 176 | 55.7 | 65.4 |
| 124 | 38.2 | 46.3 |
| 88 | 24.4 | 30.4 |
| 62 | 14.3 | 18.5 |
| 44 | 7.6 | 10.5 |
| 31 | 3.5 | 5.4 |
| 22 | 1.6 | 2.7 |
| 15 | 0.5 | 1.1 |
| 11 | 0.0 | 0.1 |
| 7 | 0.0 | 0.0 |
| 5 | 0.0 | 0.0 |

In the case of 1.19 mm to 1.68 mm basalt particle samples, exposure to sodium vapors for 30 hours reduced all material to sizes less than 1.19 mm. Examination of the resulting fragments showed they had the same characteristics as cube fragments. The particles fragmented to a size distribution similar to the cube samples, ranging from 11 mm to 704 mm as shown in Table 3. The small variation in size distribution is attributable to variations in mineralogy of the basalt specimens.

From the appearance of the particles produced, the dominant mechanism of disintegration appears to be chemical reduction of iron oxides in the Ilmenite. Iron oxides are selectively reduced at grain boundaries resulting in distortion and fragmentation. The fragments consist of liberated iron oxides as well as locked particles of $SiO_2$, $TiO_2$, and $Al_2O_3$. The curvature of these fragments suggests they are peeled from the surface to relieve stresses in the lattice structure. This must proceed with a large release of energy, as indicated by the momentum needed to propel fragments away from the cube surface. The appearance of different grains in the fragments suggests locked particles of $SiO_2$, $TiO_2$, and $Al_2O_3$. Liberated grains are also present. Comparison of the size data in Table 2 shows little variation and indicates fragmentation is characteristic of the grain size of the material, with the initial particle size being of little importance.

Example 2

The experimental apparatus and procedures were identical to those described in Example 1, except that the samples were pyrex and quartz.

Pyrex is a borosilicate glass with the following composition: 80% $SiO_2$, 14% $B_2O_3$, 4% $Na_2O$, 2% $Al_2O_3$ (Corning Glass Works, 1965). It has characteristics of high chemical stability, high heat shock resistance, low coefficient of thermal expansion, and high electrical resistivity.

Quartz glass is produced from boresilicate glass by chemically removing the flux after shaping (Corning Glass Works, 1965). It has a composition of at least 96% $SiO_2$, and at most 3% $B_2O_3$ and 1% other oxides. Quartz glass properties include a lower coefficient of thermal expansion, ability to withstand large thermal shocks, and a softening temperature of 1000° C.

After exposure to sodium vapors for 30 hours at 500° C., both samples developed a brown discoloration and were no longer transparent. Microscopic examination showed the surfaces were extensively cracked and bubbled, and subdivided into irregular shaped plates. Each plate was bounded by a black margin in the case of pyrex, and turned progressively lighter towards the center. The quartz surface differed from pyrex in that the plate edges remained tightly together and were occasionally ejected.

Pyrex and quartz samples that were unexposed to sodium vapors but otherwise treated identically remained in their original condition and showed no signs of cracking or plate formation.

Since glass is a noncrystalline material, sodium vapors were not expected to penetrate and cause damage. Reports in the literature (Addison, 1984) indicate that sodium will not wet glass unless impurities are present. Therefore, surface impurities provide the only sites for sodium to attack the glass surface. Since glass does not have grain boundaries, the sodium vapors were not able to penetrate and cause internal damage.

Silicon can account for the brown and black discoloration, since it is reported as a black to grey color in its crystalline form and as a dark brown powder in its amorphous form (Budavari, 1989). Cracking would be caused by differences in the expansion coefficients of silicon and $Na_2SiO_3$, Since there were no grain boundaries for sodium vapors to penetrate, the vapors were restricted to reactions near the surface.

Alumina

The experimental apparatus and procedures were identical to those described in Example 1, except that the samples were alumina. The alumina samples were polycrystalline hollow cylindrical pieces 6 mm in diameter and 24 mm in length. The composition was approximately 98% $Al_2O_3$ and 2% other oxides.

The alumina samples showed no signs of weakening or fragmentation after exposure to sodium vapors for 30 hours. The surface had a faint grey color, but otherwise appeared to be in its original condition. Microscopic examination of the surface also failed to detect any changes. Alumina has grain boundaries. However, it is stable and would not be expected to be reduced by sodium.

In theory, it was shown through thermodynamics that sodium will not reduce alumina. The undamaged samples confirm this expectation and also eliminate the possibility of this material being degraded by grain boundary embrittlement.

Pyrite

The experimental apparatus and procedures were identical to those described in Example 1, except that the samples were pyrite. The pyrite was obtained from deposits near Huanzala, Peru. Samples were a brassy metallic yellow with large striated crystals.

Pyrite reacted thoroughly with sodium vapors to produce a grayish white and red powder. This was accompanied by a strong odor of $H_2S$ gas. Over a 2 hour period, the powder reacted with air to form a fine black powder. This was moderately magnetic and had a size distribution of 124 μm to 1 μm. A closer look at the powder showed that the particles had a needle like shape and adhered to one another.

The reaction of pyrite with sodium vapors should follow the reactions shown in Table 4. After removing the products from the pressure vessel and exposing them to air, they may further react in the wide number of ways shown in Table 5.

TABLE 4

The Reactions of Pyrite with Sodium Vapors

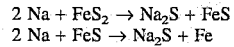
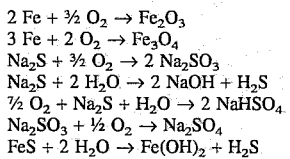

TABLE 5

Figure 3:
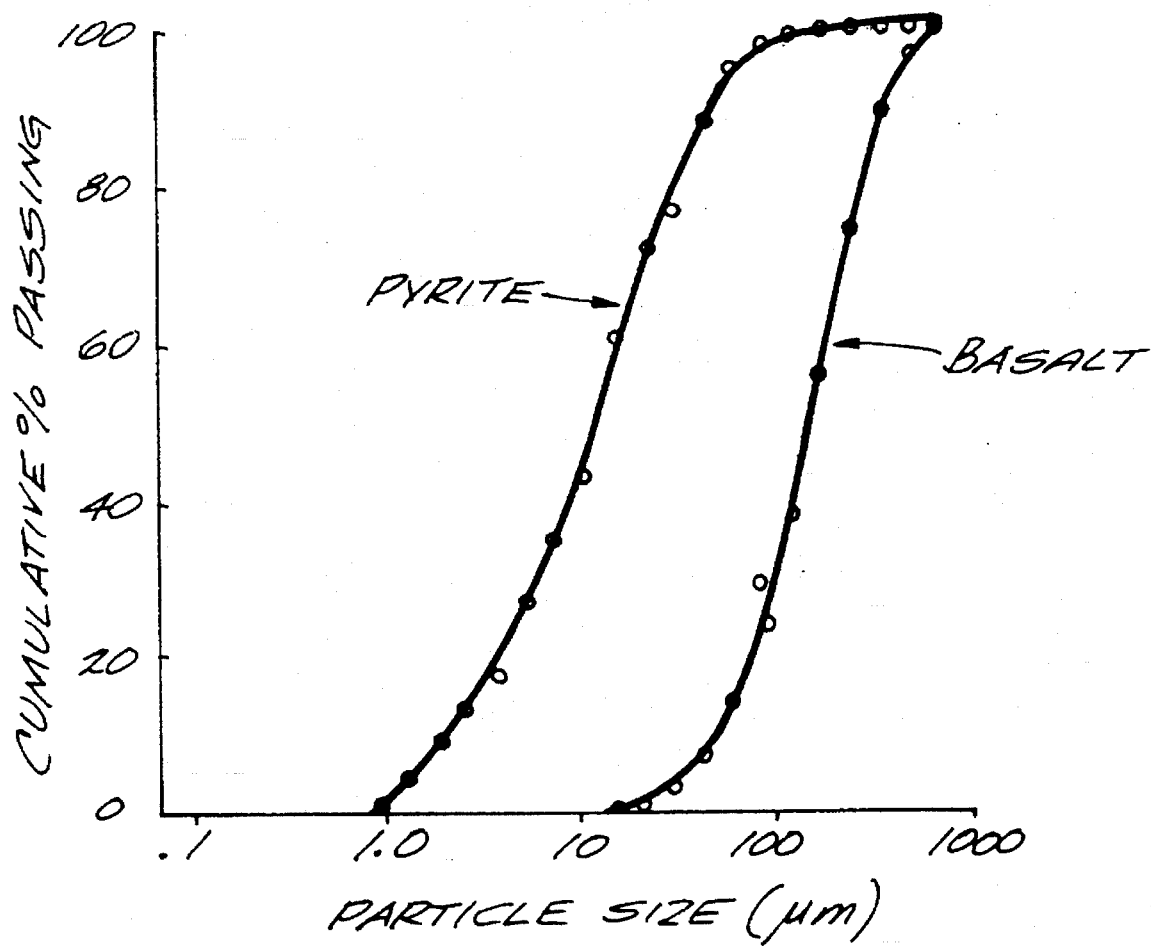
FIG. 3 is a diagram showing Particle Size distributions for Basalt and Pyrite powders produced by a method of the invention.

The Reactions of Pyrite and Sodium Vapor Reaction Products when Exposed to Air $2\,Fe + 3/2\,O_2 \rightarrow Fe_2O_3$
$3\,Fe + 2\,O_2 \rightarrow Fe_3O_4$
$Na_2S + 3/2\,O_2 \rightarrow 2\,Na_2SO_3$
$Na_2S + 2\,H_2O \rightarrow 2\,NaOH + H_2S$
$1/2\,O_2 + Na_2S + H_2O \rightarrow 2\,NaHSO_4$
$Na_2SO_3 + 1/2\,O_2 \rightarrow Na_2SO_4$
$FeS + 2\,H_2O \rightarrow Fe(OH)_2 + H_2S$ The result is that the pyrite is first converted to pyrrhotite and elemental iron, bonded together by sodium sulfide. Exposure to air and moisture produces secondary reactions which complete the disintegration of the pyrite. The overall reaction is thorough and complete. While pyrite is thoroughly disintegrated by the sodium vapors, the product is no longer pyrite, aside from crystals which were shielded from the vapor. The disintegration mechanism is therefore not the same as that for the basalt samples, in which the particles are still composed of the same minerals at the end of the process. As a result, the powder produced from the pyrite is much finer than that produced from the basalt, as can be seen in FIG. 3.

We claim:

1. A method for producing powder from polycrystalline oxides, sulfides, silicates, and mixtures thereof, comprising the step of contacting polycrystalline inorganic material with the vapor of a reduced alkali metal in an environment substantially free of oxygen for a period of time sufficient to cause disintegration of said polycrystalline inorganic material into powder.

2. A method according to claim 1, wherein said polycrystalline inorganic material is a mineral.

3. A method according to claim 2, wherein said mineral material is basalt.

4. A method according to claim 2, wherein said mineral material is pyrite.

5. A method according to claim 1, wherein said alkali metal is sodium.

6. A method according to claim 5, wherein said method is carried out at a temperature at least about 500° C.

7. A method according to claim 5, wherein said method is carried out at a total pressure of about 1 atmosphere.

8. A method according to claim 5, wherein said method is carried out at a partial pressure of sodium vapor in the range of about 5 to about 6 torr.

9. A method according to claim 5, wherein said period of time ranges from 5 minutes to 30 days.

10. A method according to claim 5, wherein said period of time is about 30 hours.

11. A method according to claim 1, wherein said alkali metal is potassium.

12. A method according to claim 1, wherein said alkali metal vapor is produced by heating alkali metal to a temperature sufficient to vaporize said alkali metal.

13. A method for producing powder from polycrystalline inorganic material, comprising the step of contacting polycrystalline inorganic material with the vapor of a reduced alkali metal in an environment substantially free of oxygen for a period of time sufficient to cause disintegration of said polycrystalline inorganic material into powder, carrying out said method in a vessel constructed of material which is not reactive with the vapor of alkali metals, and purging said vessel with inert gas.

14. A method according to claim 13, wherein said vessel is constructed of stainless steel.

15. A method according to claim 13, wherein said vessel is constructed of titanium.

16. A method for producing powder from polycrystalline inorganic material, comprising the step of contacting polycrystalline inorganic material with the vapor of a reduced alkali metal in an environment substantially free of oxygen for a period of time sufficient to cause disintegration of said polycrystalline inorganic material into powder, and vibrating said polycrystalline inorganic material to aid disintegration.

17. A method for producing powder from polycrystalline inorganic material, comprising the step of contacting polycrystalline inorganic material with the vapor of a reduced alkali metal in an environment substantially free of oxygen for a period of time sufficient to cause disintegration of said polycrystalline inorganic material into powder, and abrading said polycrystalline inorganic material to aid disintegration.

18. A method for producing powder from polycrystalline inorganic material, comprising the step of contacting polycrystalline inorganic material with the vapor of a reduced alkali metal in an environment substantially free of oxygen for a period of time sufficient to cause disintegration of said polycrystalline inorganic material into powder, and impacting said polycrystalline inorganic material to aid disintegration.

19. A method for producing powder from polycrystalline inorganic material, comprising the step of contacting polycrystalline inorganic material with the vapor of a reduced alkali metal in an environment substantially free of oxygen for a period of time sufficient to cause disintegration of said polycrystalline inorganic material into powder, and said polycrystalline inorganic material resting upon a perforated member having openings smaller than about 100 micrometers.

20. A method according to claim 1, wherein the particles of said powder range in size from about 1 to about 1000 μm.

21. A method according to claim 1, wherein said powder is substantially composed of single crystal particles.

22. A method for producing powder from polycrystalline inorganic material, comprising the step of contacting polycrystalline inorganic material with the vapor of a reduced alkali metal in an environment substantially free of oxygen for a period of time sufficient to cause disintegration of said polycrystalline inorganic material into powder, and said alkali metal being lithium.

* * * * *